(12) United States Patent
Hoang et al.

(10) Patent No.: US 8,355,727 B2
(45) Date of Patent: Jan. 15, 2013

(54) PROXIMITY DETECTION IN A NETWORK (75) Inventors: Minh Hoang, Acton, MA (US);
Kenneth Jones, Atkinson, NH (US)

(73) Assignee: Airvana, Corp., Chelmsford, MA (US)

( * ) Notice: Subject to any disclaimer, the term of this patent is extended or adjusted under 35 U.S.C. 154(b) by 875 days.

(21) Appl. No.: 11/960,026

(22) Filed: Dec. 19, 2007

(65) Prior Publication Data

US 2009/0163216 A1   Jun. 25, 2009

(51) Int. Cl.
*H04W 36/00* (2009.01)
(52) U.S. Cl. ............... 455/444; 455/435.1; 455/436; 455/440; 455/442; 370/328; 370/331; 370/332; 370/338
(58) Field of Classification Search .......... 455/127.4, 455/432.1, 434, 435.1, 435.2, 435.3, 436–444, 455/450, 455, 458, 464, 515–517, 524, 525, 455/550.1, 552.1; 370/310, 320, 322, 324, 370/328, 329, 331, 332, 335, 341, 342, 338
See application file for complete search history.

(56) References Cited

U.S. PATENT DOCUMENTS

| | | | |
|---|---|---|---|
| 6,711,144 B1 | 3/2004 | Kim et al. | |
| 6,731,618 B1 | 5/2004 | Chung et al. | |
| 6,741,862 B2 | 5/2004 | Chung et al. | |
| 6,744,747 B2 * | 6/2004 | Shiu et al. | 370/331 |
| 6,781,999 B2 | 8/2004 | Eyuboglu et al. | |
| 7,170,871 B2 | 1/2007 | Eyuboglu et al. | |
| 7,200,391 B2 | 4/2007 | Chung et al. | |
| 7,236,785 B2 * | 6/2007 | Ozluturk | 455/436 |
| 7,242,958 B2 | 7/2007 | Chung et al. | |
| 7,277,446 B1 | 10/2007 | Abi-Nassif et al. | |
| 7,299,278 B2 | 11/2007 | Ch'ng | |
| 7,558,356 B2 | 7/2009 | Pollman et al. | |
| 7,558,588 B2 | 7/2009 | To et al. | |
| 7,603,127 B2 | 10/2009 | Chung et al. | |
| 2002/0196749 A1 | 12/2002 | Eyuboglu et al. | |
| 2003/0100311 A1 | 5/2003 | Chung et al. | |
| 2005/0213555 A1 | 9/2005 | Eyuboglu et al. | |
| 2005/0243749 A1 | 11/2005 | Mehrabanzad et al. | |
| 2005/0245279 A1 | 11/2005 | Mehrabanzad et al. | |
| 2006/0067422 A1 | 3/2006 | Chung | |
| 2006/0067451 A1 | 3/2006 | Pollman et al. | |
| 2006/0126509 A1 | 6/2006 | Abi-Nassif | |
| 2006/0159045 A1 | 7/2006 | Ananthaiyer et al. | |

(Continued)

FOREIGN PATENT DOCUMENTS

GB   2452688   3/2009

OTHER PUBLICATIONS

3rd Generation Partnership Project 2 "3GPP2", "cdma2000 High Rate Packet Data Interface Specification", C.S0024, version 2, Oct. 27, 2000 (441 pages).

(Continued)

*Primary Examiner* — Anthony Addy
(74) *Attorney, Agent, or Firm* — Fish & Richardson P.C.

(57) ABSTRACT

Techniques for facilitating a hand-in using proximity-detection and dual-pilot operation detect a presence of a client device in proximity to the network-side device; and transmit a first signal over a first communication channel to the client device, the first signal enabling the client device to access information transmitted in a second signal from the network-side device.

15 Claims, 8 Drawing Sheets

U.S. PATENT DOCUMENTS

| | | |
|---|---|---|
| 2006/0240782 A1 | 10/2006 | Pollman et al. |
| 2006/0291420 A1 | 12/2006 | Ng |
| 2006/0294241 A1 | 12/2006 | Cherian et al. |
| 2007/0026884 A1 | 2/2007 | Rao |
| 2007/0058628 A1 | 3/2007 | Rao et al. |
| 2007/0077948 A1 | 4/2007 | Sharma et al. |
| 2007/0097916 A1 | 5/2007 | Eyuboglu et al. |
| 2007/0115896 A1 | 5/2007 | To et al. |
| 2007/0140172 A1 | 6/2007 | Garg et al. |
| 2007/0140184 A1 | 6/2007 | Garg et al. |
| 2007/0140185 A1 | 6/2007 | Garg et al. |
| 2007/0140218 A1 | 6/2007 | Nair et al. |
| 2007/0155329 A1 | 7/2007 | Mehrabanzad et al. |
| 2007/0220573 A1 | 9/2007 | Chiussi et al. |
| 2007/0230419 A1 | 10/2007 | Raman et al. |
| 2007/0238442 A1 | 10/2007 | Mate et al. |
| 2007/0238476 A1 | 10/2007 | Raman et al. |
| 2007/0242648 A1 | 10/2007 | Garg et al. |
| 2007/0248042 A1 | 10/2007 | Harikumar et al. |
| 2008/0003988 A1 | 1/2008 | Richardson |
| 2008/0013488 A1 | 1/2008 | Garg et al. |
| 2008/0062925 A1 | 3/2008 | Mate et al. |
| 2008/0065752 A1 | 3/2008 | Ch'ng et al. |
| 2008/0069020 A1 | 3/2008 | Richardson |
| 2008/0069028 A1 | 3/2008 | Richardson |
| 2008/0076398 A1 | 3/2008 | Mate et al. |
| 2008/0117842 A1 | 5/2008 | Rao |
| 2008/0119172 A1 | 5/2008 | Rao et al. |
| 2008/0120417 A1 | 5/2008 | Harikumar et al. |
| 2008/0132239 A1* | 6/2008 | Khetawat et al. ............. 455/438 |
| 2008/0139203 A1 | 6/2008 | Ng et al. |
| 2008/0146232 A1 | 6/2008 | Knisely |
| 2008/0151843 A1 | 6/2008 | Valmikam et al. |
| 2008/0159236 A1 | 7/2008 | Ch'ng et al. |
| 2008/0162924 A1 | 7/2008 | Chinitz et al. |
| 2008/0162926 A1 | 7/2008 | Xiong et al. |
| 2008/0253550 A1 | 10/2008 | Ch'ng et al. |
| 2008/0254792 A1 | 10/2008 | Ch'ng |
| 2008/0305801 A1* | 12/2008 | Burgess et al. ............... 455/444 |
| 2009/0034440 A1 | 2/2009 | Samar et al. |
| 2009/0082020 A1 | 3/2009 | Ch'ng et al. |
| 2009/0088155 A1 | 4/2009 | Kim |
| 2009/0116445 A1 | 5/2009 | Samar et al. |
| 2009/0154447 A1 | 6/2009 | Humblet |
| 2009/0156165 A1 | 6/2009 | Raghothaman et al. |
| 2009/0156195 A1 | 6/2009 | Humblet |
| 2009/0156218 A1 | 6/2009 | Garg et al. |
| 2009/0163202 A1 | 6/2009 | Humblet et al. |
| 2009/0163216 A1 | 6/2009 | Hoang et al. |
| 2009/0163238 A1 | 6/2009 | Rao et al. |
| 2009/0164547 A1 | 6/2009 | Ch'ng et al. |
| 2009/0168766 A1 | 7/2009 | Eyuboglu et al. |
| 2009/0168788 A1 | 7/2009 | Den et al. |
| 2009/0170440 A1 | 7/2009 | Eyuboglu et al. |
| 2009/0170475 A1 | 7/2009 | Ch'ng et al. |
| 2009/0170520 A1 | 7/2009 | Jones |
| 2009/0170547 A1 | 7/2009 | Raghothaman et al. |
| 2009/0172169 A1 | 7/2009 | Ch'Ng et al. |
| 2009/0172397 A1 | 7/2009 | Kim |
| 2009/0186626 A1 | 7/2009 | Raghothaman et al. |
| 2009/0262697 A1 | 10/2009 | To et al. |
| 2010/0093351 A1* | 4/2010 | Barrett et al. ................. 455/436 |
| 2010/0120437 A1* | 5/2010 | Foster et al. .................. 455/444 |

OTHER PUBLICATIONS

3rd Generation Partnership Project 2 "3GPP2", "cdma2000 High Rate Packet Data Interface Specification", C.S0024-A, version 2, Jul. 2005 (1227 pages).

3rd Generation Partnership Project 2 "3GPP2", "cdma2000 High Rate Packet Data Interface Specification", C.S0024-B, version 1, Apr. 2006 (1623 pages).

3rd Generation Partnership Project 2 "3GPP2", "cdma2000 High Rate Packet Data Interface Specification", C.S0024-B, version 2, Mar. 2007 (1627 pages).

3rd Generation Partnership Project 2 "3GPP2", "cdma2000 High Rate Packet Data Interface Specification", C.S0024, version 4, Oct. 25, 2002 (548 pages).

3rd Generation Partnership Project 2 "3GPP2", "cdma2000 High Rate Packet Data Interface Specification", C.S0024-A, version 1, Mar. 2004 (1083 pages).

* cited by examiner

PROXIMITY DETECTION IN A NETWORK

TECHNICAL FIELD

This description relates to proximity detection in a network.

BACKGROUND

Cellular wireless communications systems, for example, are designed to serve multiple wireless-enabled devices distributed over a large geographic area by dividing the area into regions called "cells". At or near the center of each cell, a network-side access device (e.g., an access point) is located to serve client devices located in the cell and commonly referred to as "access terminals." Examples of access terminals include cellular telephones, laptops, PDAs, and other wireless-enabled devices. An access terminal generally establishes a call, also referred to as a "communication session," with an access point to communicate with other entities (e.g., servers) in the network.

SUMMARY

In general, in one aspect, this application describes methods and computer programs for facilitating a hand-in to a network-side device. A presence of a client device in proximity to the network-side device is detected, and a first signal is transmitted over a first communication channel. The first signal includes information for enabling the client device to access information included in a second signal transmitted by the network-side device. The information included in the second signal enables communication with the network-side device over a second communication channel.

In general, in another aspect, the application describes a system that includes a receiver configured to detect a signal transmitted by a client device, wherein a property of the signal indicates that the client device is within communication range of the system; a communication module configured to transmit first and second signals, the first signal including information for enabling the client device to establish communications with the system over a first communication channel; and information for enabling the client device to access information included in the second signal, the information included in the second signal enabling communication over the second communication channel; and one or more processors configured to control the receiver and the communication module.

In general, in a further aspect, the application describes methods and computer programs for transferring a communication connection from a first network-side device to a second network-side device. Some methods include selecting a first code from a plurality of codes, the first code enabling communications with the second network-side device over a first communication channel; using the first code to extract information from a first signal received from the second network-side device over the first communication channel, the information including a second code for enabling communications with the second network-side device over a second communication channel; and resuming communications over the second communication channel.

Implementations may include one or more of the following. Transmission of the first signal may be ceased after initiating communication with the client device over the second communication channel. The second signal may be transmitted continuously during a time when the network-side device is in service. The first signal may be transmitted in response to receiving an indication that the client device is authorized to connect to the network-side device. The information included in the first signal may include a code for decoding the second signal, wherein decoding enables access to the information included in the second signal. A signal transmitted by the client device may be received and analyzed to determine whether the client device is within communication range of the network-side device. The first and second channels may use different modalities of communication, e.g., one uses RF communication and the other uses cellular communication.

The communication module may continually transmit the second signal but not transmit the first signal unless directed by the one or more processors. The system may further include a database storing identification information associated with access terminals having authorization to communicate with the system; and one or more of the processors may be configured to determine whether the client device has authorization to communicate with the system and direct the communication module to transmit the first signal in response to determining that the client device has authorization. The first signal may be transmitted only when an authorized client device is within sufficient communication range. The communication module may be configured to transmit the first signal continuously upon receiving a command from an owner or system administrator of the system.

Advantages may include one or more of the following. A larger number of scrambling codes can be assigned to femtocells. The likelihood of inter-femtocell interference and unauthorized hand-over attempts is reduced. Femtocells can determine when access terminals are within communication range of the femtocell without using cellular band signals. Femtocells can be deployed in an ad-hoc fashion with high density. For example, femtocells may be deployed in the homes or office spaces of densely populated areas.

The details of one or more embodiments are set forth in the accompanying drawings and the description below. Other features, objects, and advantages will be apparent from the description and drawings, and from the claims.

DETAILED DESCRIPTION

In wireless communication networks, the geographic areas served by access points, also referred to as "service areas," may vary in size and may include smaller service areas and/or may be located within larger service areas. Larger geographic areas that include one or more smaller service areas are referred to as "macrocell areas," and an access point that serves a macrocell area is referred to as a "macrocell." Within a macrocell area, one or more access points may be located to serve smaller geographic areas, referred to as "femtocell areas." An access point that serves a femtocell area is referred to as a "femtocell." A macrocell, for example, may cover an area of a few blocks, while a femto cell may cover an area spanning a floor of a building, a house, or an office space.

A call established between an access point and an access terminal may be transferred to another access point in a process referred to as a "handoff". From the point of view of a particular access point, there are 2 types of hand-offs: a "hand-out" moves a in-progress call out to a neighboring access point (allowing the access point to free up its resources) and a "hand-in" occurs when a neighboring access point transfers an in-progress call into the access point (the access point needs to allocate resources to service the call).

A handoff may be performed for a variety of different reasons. Typically, a handoff occurs when an access terminal moves into a different coverage area. For example, a call that has been established with a macrocell may be transferred to a neighboring macrocell when the access terminal moves outside of the service area covered by the macrocell. A handoff may also occur when the capacity for connecting new calls to a particular macrocell is reached. In this scenario, the macrocell may transfer an existing call (or a new call) to another macrocell with overlapping coverage.

Hand-offs between macrocells and femtocells may occur for similar/other reasons. A femtocell hand-in may occur when an access terminal determines that a neighboring femtocell can provide faster and/or more robust communications with the access terminal than can the macrocell. For example, the access terminal could be located in closer geographic proximity to the femtocell or there may be fewer obstructions in the communication path between the femtocell and the access terminal. Or femtocell hand-in may occur whenever a femtocell signal is detected by the access terminal because it is operator policy to prefer femtocell usage over macrocell.

To facilitate a handoff, an access terminal determines nearby macrocells or femtocells from information provided by the access point which is currently servicing the call. The information, collectively, is referred to as a "neighbor list" and includes scrambling codes and channel frequencies assigned to neighboring macrocells and femtocells. The scrambling codes are used in CDMA to separate transmissions from different access points sharing the same channel frequencies.

In a conventional hand-off processes, an access terminal selects a scrambling code of a nearby access point from the neighbor list received from its current access point. The access terminal uses the scrambling code to decode a pilot signal that is continuously transmitted by the nearby access point in order to determine the quality of the communication channel between itself and that access point. For example, the access terminal can determine the signal-to-noise ratio, and the bandwidth of the communication channel. If the access terminal determines that the communication channel is of sufficient quality, it establishes communication with the nearby access point. Otherwise, it selects the scrambling code of a different access point from the neighbor list, tests the associated pilot signal, and repeats the process until a suitable access point is determined. For many conventional systems, in order for an access point to perform a hand-off, the access terminal needs to be able to (1) obtain the scrambling code for decoding the pilot signal and (2) detect the pilot signal transmitted by a neighbor access point.

Based on existing standards, the neighbor list length is limited (e.g., to 32 scrambling codes or less in UMTS) and each scrambling code must be uniquely associated with one access point. This suffices for a conventional macrocell deployment since the number of macrocell neighbors is planned to fit within the neighbor list limit. However, the optimistic femtocell deployment model envisions hundreds or thousands of femtocells within a macrocell area. As a result, multiple femtocells are forced to share a small set of scrambling codes.

As a limited set of scrambling codes are distributed and reused by multiple femtocells within a macrocell area, identifying a specific neighboring femtocell from detected scrambling codes may not be feasible, as there is no longer a unique binding between a scrambling code and a femtocell. Consequently, an access terminal in an active call is likely to trigger a hand-in request to a nearby femtocell with which it is not authorized to communicate. The resulting failed hand-in may cause conversation gaps or service interruptions in the communication connection and possibly cause the communication connection to be unexpectedly dropped. Complications resulting from unauthorized hand-in requests are generally referred to as "hand-in interference." As femtocells are increasingly deployed in densely populated areas and largely in an ad-hoc fashion, hand-in interference is likely to have a disruptive impact on communications Here we describe systems and hand-in methods that address some of the afore-mentioned problems with large scale femtocell deployment. By using proximity-detection and dual-pilot operation, the improved system is implementable without changes to existing access terminals and macrocells.

Figure 1:
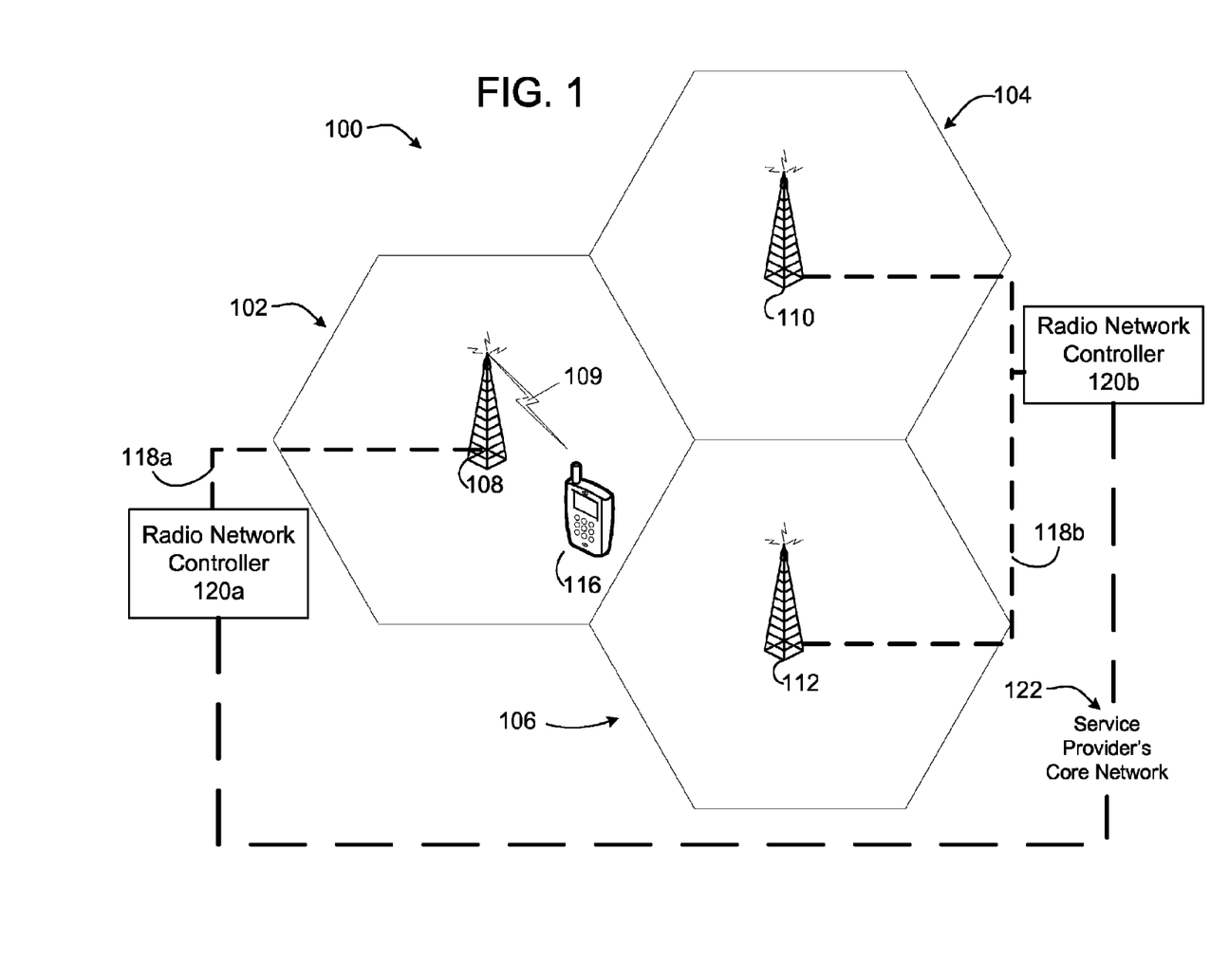
FIG. 1 is a block diagram of a radio access network (RAN).

Referring to FIG. 1, a radio access network (RAN) 100 includes multiple access points or "macrocells" 108, 110, and 112 located in macrocell areas 102, 104, and 106, respectively. The macrocell areas 102, 104, and 106 can include one or more femtocells. The macrocells 108, 110, and 112 are each configured to communicate with an access terminal over an airlink. For example, macrocell 108 communicates with access terminal 116 over an airlink 109. Macrocells 108, 110, and 112 are connected over a backhaul connection (e.g., backhaul connection 118a or 118b) to a radio network controller (RNC) which in turn communicates with the service provider's core network 122, e.g., via RNC 120a or 120b, which may be one or more physical devices at different locations.

The RAN 100 is configured to support various mobile wireless access technologies, examples of which include UMTS and CDMA 2000. The 1xEV-DO protocol has been standardized by the Telecommunication Industry Association (TIA) as TIA/EIA/IS-856, "CDMA2000 High Rate Packet Data Air Interface Specification," 3GPP2 C.S0024-0, Version 4.0, Oct. 25, 2002, which is incorporated herein by reference. Revision A to this specification has been published as TIA/EIA/IS-856A, "CDMA2000 High Rate Packet Data Air Interface Specification," 3GPP2 C.S0024-A, Version 2.0, July 2005. Revision A is also incorporated herein by reference. Revision B to this specification has been published as TIA/EIA/IS-856-B, 3GPP2 C.S0024-B and is also incorporated herein by reference. Other wireless communication standards may also be used. Although this description uses terminology from the 3GPP's UMTS standards, the same concepts are applicable to other wireless communication standards, including CDMA 1x EV-DO, CDMA2000, WiMax, WiBro, WiFi, and the like.

The macrocells 108, 110, 112 are assigned different scrambling codes for encoding and decoding communications with access terminals. In some implementations, the scrambling codes are known binary sequences that appear random. For example, the scrambling codes may resemble random noise. Macrocells 108, 110, 112 are generally identical with respect to operation and structure. Therefore, for ease of explanation, only macrocell 108 will be described further described in detail.

The macrocell 108 encodes information contained in a baseband signal by multiplying the baseband symbols with its scrambling code The resulting encoded signal is then transmitted to an access terminal, e.g., access terminal 116, that has established a communication session with the macrocell 108. Though the encoded signal appears as unintelligible noise, the access terminal 116 can recover the baseband symbols, and thus the information contained within, by applying the scrambling code of the macrocell 108 to the received encoded signal. Thus an access terminal can communicate with a particular macrocell only if it has the scrambling code assigned to that macrocell.

Figure 2:
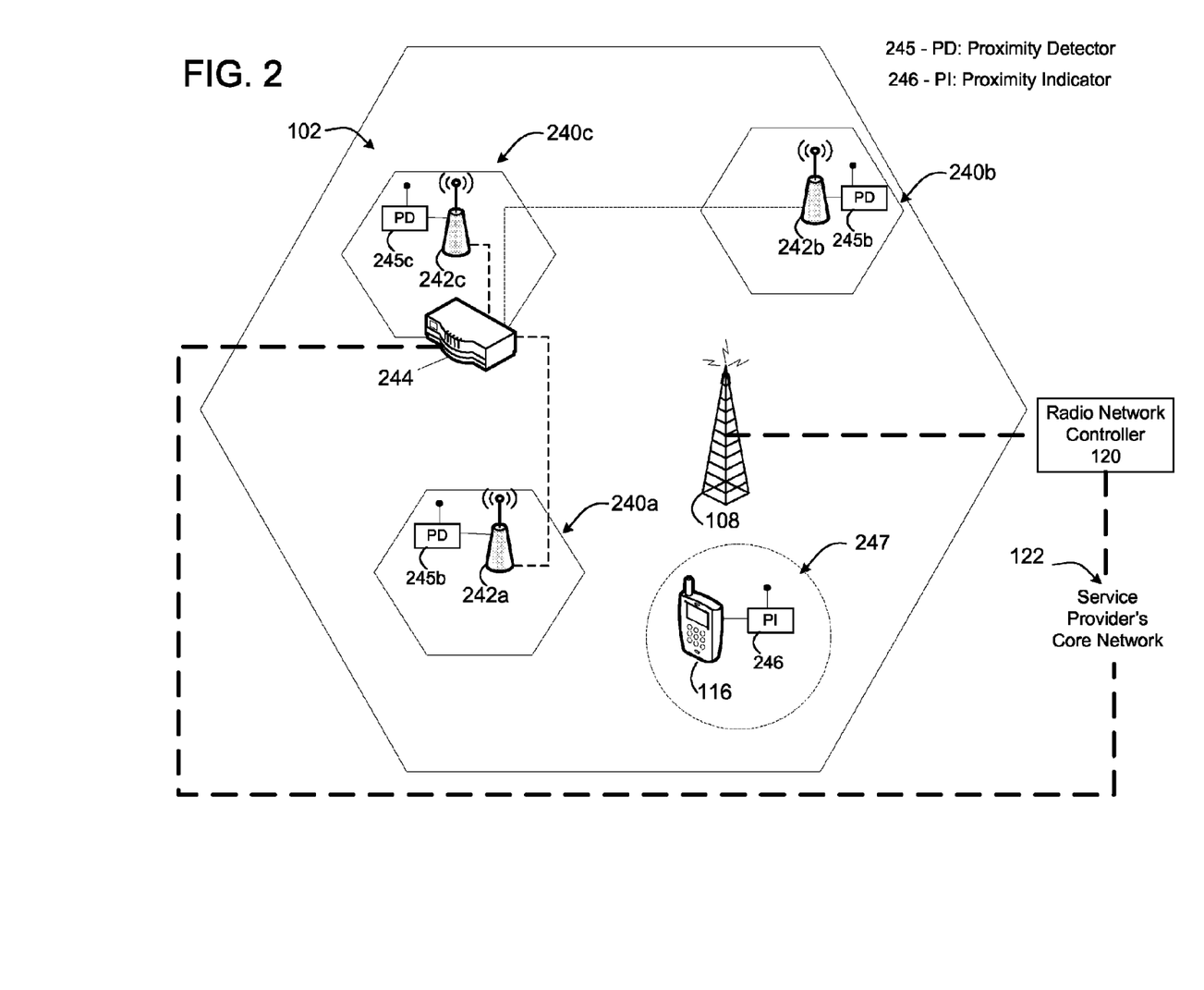
FIG. 2 is a block diagram of a femtocell deployment within a macrocell area.

Referring to FIG. 2, the service area 102 of macrocell 108 includes femtocells areas 240a, 240b, and 240c served by access points 242a, 242b, and 242c, respectively. Hereinafter, the access points 242a, 242b, and 242c are referred to as "femtocells 242a, 242b, and 242c." Although, only three femtocells are shown in FIG. 2, in practice a macrocell area can include many more femtocells. For example, a macrocell area could include hundreds, thousands, or hundreds of thousands of femtocells.

The femtocell server 244 is in communication with one or more of the femtocells 242a-c. The femtocell server 244 maintains active associations between access terminals and the femtocells 242a-c so that a hand-in request from the macrocell 108 (or other components of the mobile core network) can be directed to the correct femtocell. In some embodiments, one or more of the femtocells 242a-c and the femtocell server 244 are combined as a single device. In early deployment, the femtocell server 244 may present a similar, conventional system interface as that of RNC 120 to the existing core network infrastructure. The femtocell server 244 is described in further detail in connection with FIG. 5.

In the preferred embodiment, a wireless proximity detection system operates in parallel with the cellular communication system in each of the femtocells 242a, 242b, and 242c. Each of the femtocells contains a proximity detector (PD) 245. A proximity indicator 246 is located with each access terminal 116. In some embodiments, the proximity indicator 246 is a radio frequency device which can transmit a unique identification code, e.g., using RFID or Bluetooth communication modalities. Based on existing technology, such devices can be instantiated as a small tag to be conveniently attached to a conventional access terminal. The tag's transmit power is set such that the proximity detector 245 can correctly receive these codes when the tag is within a certain range (shown as perimeter 247). The femtocell is configured with a list of tag codes which are linked to its authorized users. By matching the correctly received codes with this list, the femtocell can determine that authorized handsets are in range.

Each of the femtocells 242a-c is equipped to continuously transmit or broadcast a conventional main pilot signal. In addition each femtocell is also capable of transmitting a second pilot signal concurrently with the main pilot. This second pilot signal is designated the "greeting pilot" and is turned on or off based on inputs from the proximity detection receiver.

The main pilot is decoded with a main scrambling code assigned to a particular femtocell. The terms "main scrambling code" and "main pilot" may also be referred to as "operating scrambling code" and "operating pilot," respectively. The femtocells' main scrambling codes are assigned with maximum geographic dispersal in order to minimize radio interference probability (given that they are reused within a macrocell area in a dense deployment.) The main scrambling codes assigned to the femtocells 242a-c are different from the set of scrambling codes stored in the neighbor list of the macrocell 108. Therefore the available set of main scrambling codes for femtocells is not restricted by the size of the neighbor list.

The greeting pilot is encoded/decoded using a scrambling code selected from a predetermined set of "greeting scrambling codes". The set of greeting scrambling codes is relatively small (e.g., between 1 and 4) compared to the total number of main scrambling codes assigned to the femtocells within a macrocell area. Unlike the main scrambling codes, the greeting scrambling codes of the femtocells 242a-c are populated in the neighbor list of the macrocell 108.

Although the main pilots of the femtocells 242a-c are always on, e.g., continuously transmitted while the femtocells 14a-c are in service, the greeting pilots of the femtocells 242a-c are normally turned off. A femtocell (e.g., femtocell 242a) turns on its greeting pilot when it decides to invite an access terminal into its service area. This decision is based partially on inputs from its proximity detector 245 including: (1) an indication that the access terminal is within range, and (2) a determination that the access terminal is authorized to communicate with the femtocell.

If these conditions (1) and (2) are not met, the femtocell will not turn on its greeting pilot. For example, even if the femtocell 242a determines that the access terminal 116 is within range, if the femtocell 242a determines that the access terminal 116 lacks the appropriate authorization, the femtocell 242a will not turn on its greeting pilot. Consequently, the access terminal 116 cannot connect to the femtocell 242a as the femtocell 242a remains "invisible" to the access terminal 116. In this manner, the femtocell 242a can reduce the number of communication attempts by unauthorized access terminals. Furthermore, since main scrambling codes of the femtocells 242a-c are not announced by the macrocell 108, the access terminal 116 will not monitor the signal strengths of the femtocells' main pilots, which, as described earlier for conventional systems, can trigger a hand-in attempt to an unauthorized femtocell.

Figure 3A:
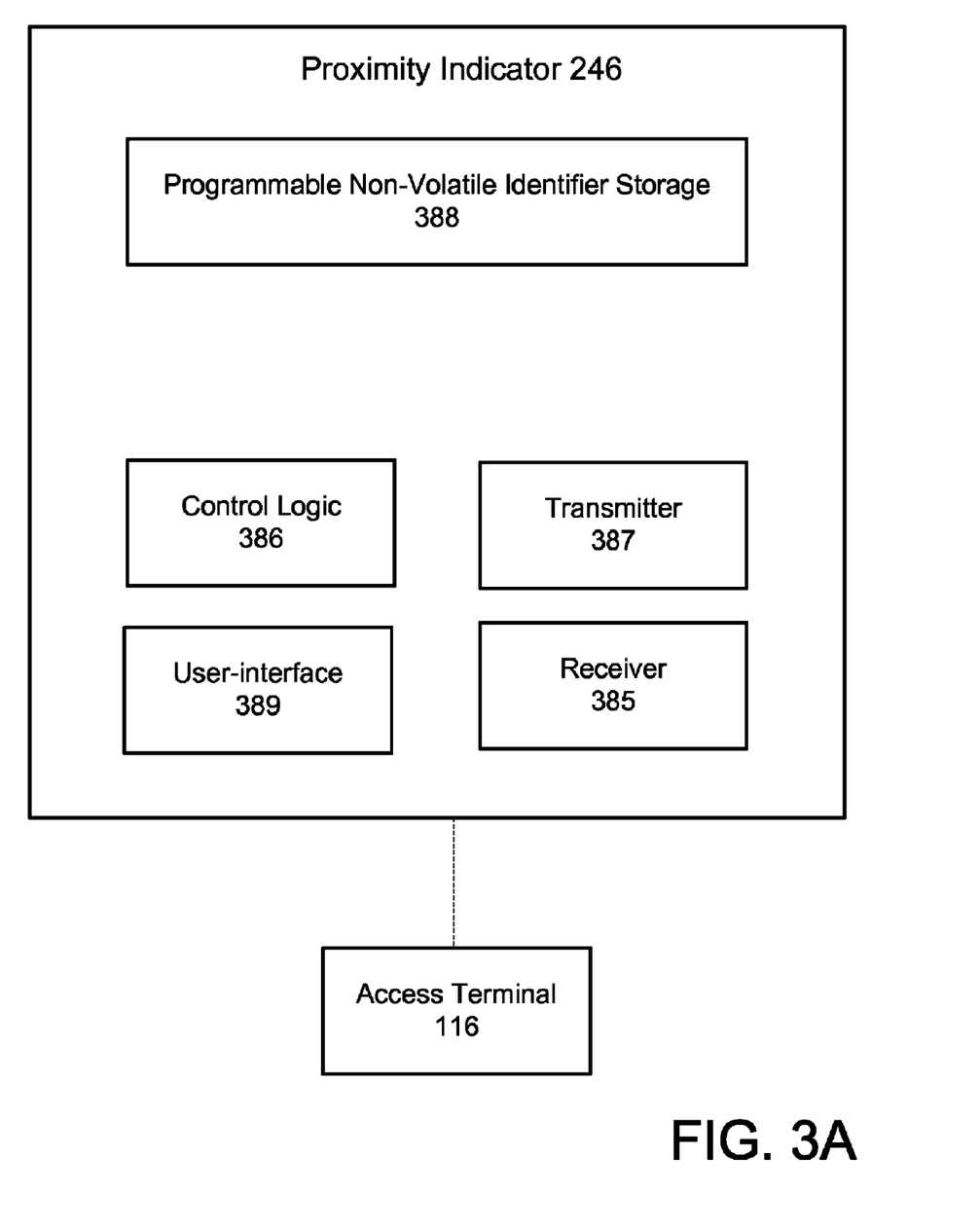
FIG. 3A is a block diagram of a proximity indicator.

Referring to FIG. 3A, a block diagram of the proximity indicator 246 is shown. It consists of a non-volatile storage block 388, a transmitter 387, and control logic 386. Some embodiments may also include a receiver 385 to provide additional inputs to the control logic. The non-volatile storage 388 holds the unique identifier for the proximity indicator 246. These identifiers are associated with authorized access terminals in a femtocell's access control list. The transmitter 387 encodes the identifier and outputs a signal having a power adjusted such that a femtocell's proximity detector (e.g., in any one of femtocells 242a-c) can correctly decode the identifier when the proximity indicator 246 is within a certain range. If the decoded identifier is found in the femtocell's access control list, the femtocell can infer that an authorized access terminal is within communication range, since the proximity indicator 246 is typically attached to an access terminal 116.

In general, the control logic 386 may trigger the transmitter 387 periodically at predetermined time intervals. The time intervals may be adjusted, for example, based on the amount of battery power remaining. Or the control logic 386 may trigger the transmitter 387 in response to an event. The receiver 385 in some embodiments may provide such an event to the control logic 386 when it detects its own identifier from a proximity detector's querying signal. A physical pushbutton or switch may be another event source to enable the transmitter 387 for a short time duration. These mechanisms can be used to minimize the proximity indicator's battery consumption.

To avoid interference with cellular functions, the proximity detection system utilizes a frequency spectrum that lies outside of the range allocated for cellular operations. In some embodiments, the transmitter 387 and receiver 385 may operate on one of the world-wide unlicensed bands such as 2.4 GHz or 5.8 GHz. Or they may operate using a regionally unlicensed band in the 400 MHz or 900 MHz spectrum. Or they may even use a service provider's licensed spectrum which is not occupied with cellular signals.

For the initial femtocell deployment, the proximity indicator 246 can be implemented as a small tag that can be conveniently attached to a conventional access terminal. As femtocell usage becomes more prevalent, it should be obvious to those skilled in the arts that future access terminals may choose to integrate the proximity indicator 246 and share the transmitter 387 and receiver 385 with other functions. A likely embodiment is the proximity indicator's transmitter 387 and receiver 385 being combined as a Bluetooth transceiver with other shared uses such as wireless headsets and data links to other personal devices.

The identification information transmitted by the proximity indicator 246 may be programmable, hard-coded, or partially programmable with certain portions of information hard-coded. In addition to identification information, the proximity indicator 246 may transmit other types of information including control commands that cause the femtocell 242a or server 244 to perform one or more functions. The commands may be activated manually by a user via a physical button or switch (not shown) located on the proximity indicator 246 or via a user-interface 389 of the access terminal 116 when the access terminal has an integrated proximity indicator 246. For example, an owner or administrator of a femtocell 242a can enable or disable an operational mode of the femtocell 242a by flipping a small switch on the proximity indicator tag or by activating controls presented in a user-interface of the access terminal 116.

Figure 3B:
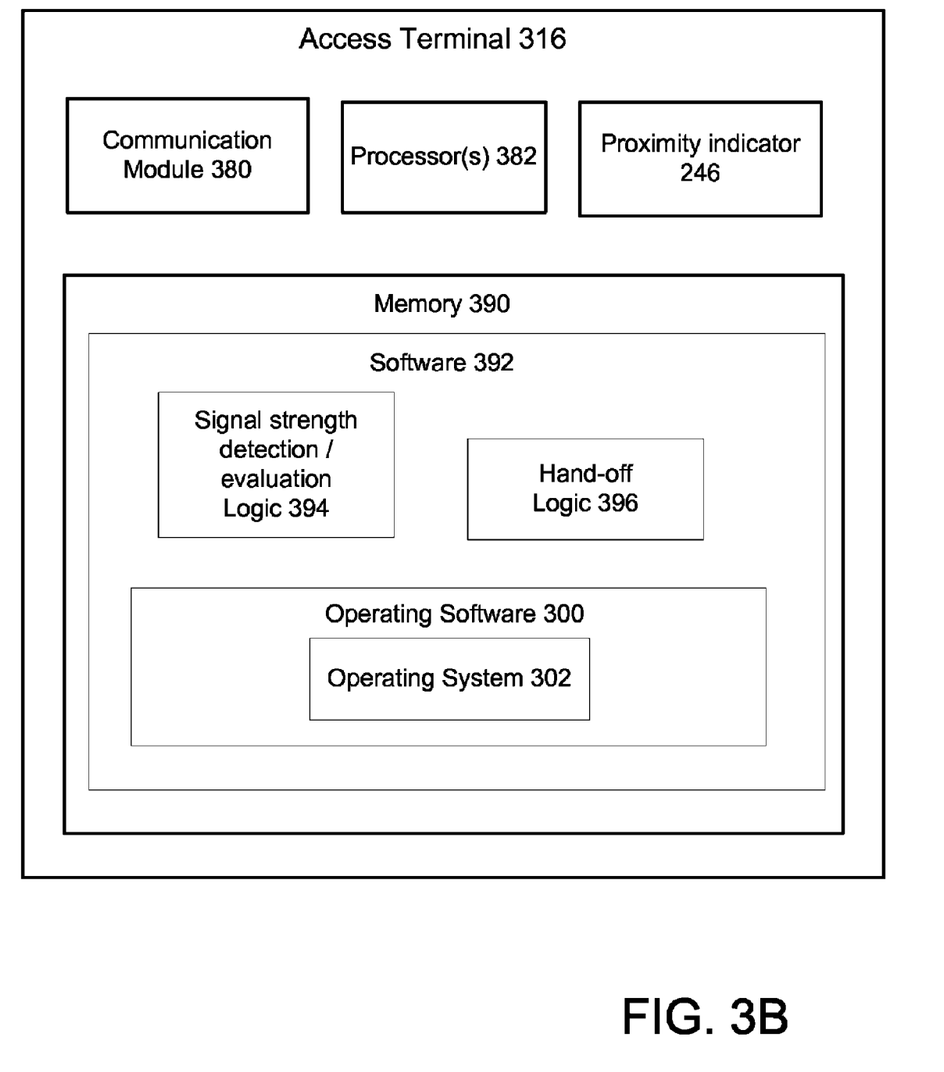
FIG. 3B is a block diagram of an access terminal.

Referring to FIG. 3B, the proximity indicator 246 (FIG. 3A) may be integrated with the access terminal 116 (FIG. 1) to provide an improved access terminal 316. Like the access terminal 116, the access terminal 316 includes one or more processor(s) 382 (referred to simply as "processor 182"); a communication module 380 for effecting communication with the femtocell server 144, the macrocell 108, and any one of the femtocells 242a-c, e.g., femtocell 242a; and memory 390 for storing software 392.

The processor 382 executes the software 392, which includes signal strength detection/evaluation logic 394 (referred to simply as "evaluation logic 394"); hand-off logic 396, and operating software 300, which includes an operating system 302, such as Linux® or vxWorks®.

The evaluation logic 394 determines the strengths of pilot signals received from various femtocells and/or macrocells and determines which is the strongest. The strength of a pilot signal indicates the quality and bandwidth of communications that can be established. Thus, given a number of possible femtocells with which to perform a hand-off, the evaluation logic 394 selects the femtocell whose greeting pilot signal is determined to be the strongest. In some embodiments, the evaluation logic 394 determines the signal strengths from measurements made by the access terminal 316. In other embodiments, the strengths are reported to the access terminal 316 by the macrocell 108.

The hand-off logic 396 directs the access terminal 316 to perform the functions necessary for performing a hand-off. These functions include obtaining a greeting scrambling code for a femtocell (e.g., femtocell 242a) from the macrocell 108, setting up a first communication channel with the femtocell 242a based on information obtained from the greeting pilot, obtaining the main scrambling code over the first communication channel, and setting up a second communication channel with the femtocell 242a based on information obtained from the main pilot. The hand-off logic 396 may also perform standard hand-off procedures that are performed in conventional wireless networks.

The access terminal's evaluation and hand-off logic 394 and 396 may remain unchanged as in conventional system. The greeting/main pilot logic in the femtocell 242a causes the access terminals to "feel" as they are moving into new coverage areas and trigger their hand-in.

For ease of explanation, in the remaining document, references to the access terminal 116 of FIG. 1 are also applicable to the access terminal 316 of FIG. 3B. Thus the terminology "access terminal 116" can be construed to mean "access terminal 116 or 316."

Figure 4:
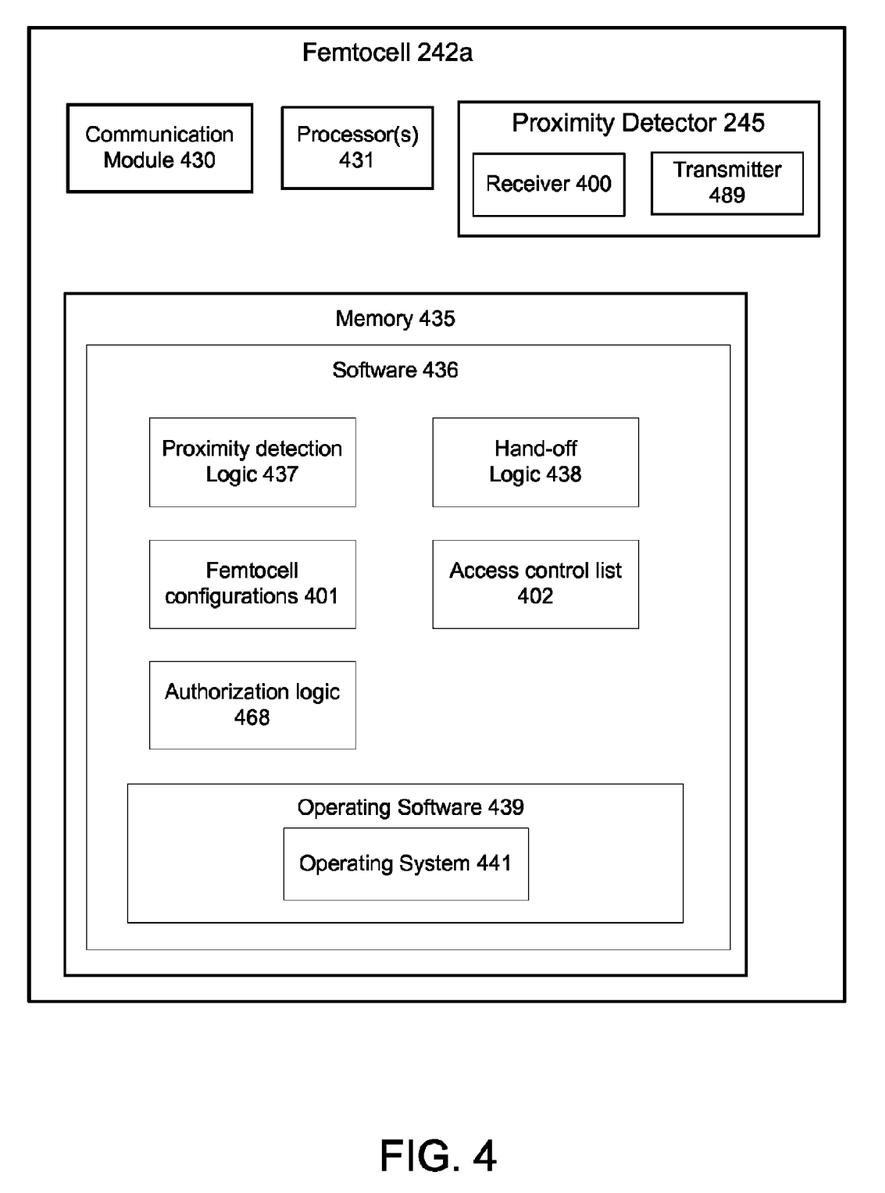
FIG. 4 is a block diagram of a femtocell.

Referring to FIG. 4, a block diagram of the femtocell 242a is shown. Femtocells 242a-c are similar both in structure and in function; therefore, only the femtocell 242a is described in further detail. The femtocell 242a includes one or more processor(s) 431 (referred to simply as "processor 431"); a communication module 430 for effecting communication with the femtocell server 244, and access terminals, e.g., access terminal 116; a proximity detector 245; and memory 435 for storing software 436, including femto cell configurations 401, and an access control list 402.

The communication module 430 facilitates communication by applying one or more communication methods (e.g., wireless CDMA and TCP/IP protocols) for transmitting and receiving data over an airlink for communicating with the access terminal 116 and over a communication link established with the femtocell server 244. The communication module 430 also uses the appropriate scrambling code or codes, which are generally stored in the memory 435, to encode outgoing information destined for access terminals and to decode incoming signals received from the access terminals. These scrambling codes include the greeting scrambling code and the main scrambling code assigned to the femtocell 242a. In some embodiments, the femtocell 242a communicates with the femtocell server 244 using a virtual private network (VPN) setup over a broadband packet-switched service.

The processor 431 executes the software 436, which includes but is not limited to proximity detection logic 437, authorization logic 468, hand-off logic 438, and operating software 439. The operating software 439 includes an operating system 441, such as Linux® or vxWorks®.

The proximity detector 245 determines whether the access terminal 116 is within range of the femtocell 242a for establishing and maintaining cellular communication. The proximity detector 245 includes a receiver 400 and a transmitter 489. The proximity detector 245 listens for signals transmitted by the proximity indicators on nearby access terminals. The receiver 400 may be configured to detect signals transmitted from access terminals without using cellular band signals. For example, as described above, the signals may be transmitted over unlicensed frequency bands.

After such a signal has been detected by the receiver 400, the proximity detection logic 437 analyzes one or more signal properties of the signal determine whether the access terminal 116 is within an acceptable communication range. For example, the proximity detection logic 437 may determine the power of the signal and compare it to a predefined threshold. Other signal properties that may be analyzed by the proximity detection logic 437 include magnitude, SNR, frequency, and phase. As described above, the signal received from the proximity indicator 246 includes identification information associated with the access terminal 116, e.g., a unique identification code. As further described below, using the identification information, the femtocell 242a determines whether the access terminal 116 is authorized to communicate with it. When the femtocell 242a determines that an authorized access terminal 116 is within communication range, it also forwards the identification information to the femtocell server 244.

The proximity detection logic 437 can be enhanced with radio resource and access terminal mobility management status to identify and ignore detached proximity indicator tags (i.e. those tags that are not moving along with their associated access terminal). In some embodiments, the femtocell 242a includes a control, e.g., a push button, to manually trigger the femtocell 242a to transmit its greeting pilot, e.g., to force the femtocell 242a to facilitate communication with an access terminal 116, especially in situations where the proximity indicator 246 is lost or malfunctioning.

The authorization logic 468 matches the received identification information with entries in its access control list 402 to determine whether the access terminal 116 is authorized to connect to the femtocell 242a. If the authorization logic 468 confirms that the access terminal 116 is authorized, the hand-off logic 438 enables the femtocell's greeting pilot to facilitate a hand-in for access terminal 116. If however, the authorization logic 468 determines that the access terminal 116 is not authorized to connect to the femtocell 242a, the hand-off logic 438 keeps the femtocell's greeting pilot turned off.

The authorization logic 468 may also implement different modes of authorization for a particular femtocell when instructed by the owner or administrator of that femtocell. For example, an owner/administrator can configure the femtocell 242a to operate in a "visitor mode," in which no authorization is required to connect to the femtocell 242a. When operating in visitor mode, the femtocell 242a facilitates communication with access terminals determined to be within range (e.g., by turning on the greeting pilot) regardless of whether the access terminals are authorized in the access control list. As described above, the owner/administrator can activate or deactivate the visitor mode (or other modes) by flipping a small switch located on the proximity indicator 246 attached to the access terminal. Or the owner/administrator can do this via other mechanisms such a self-service web portal or a switch on the femtocell.

Figure 6A:
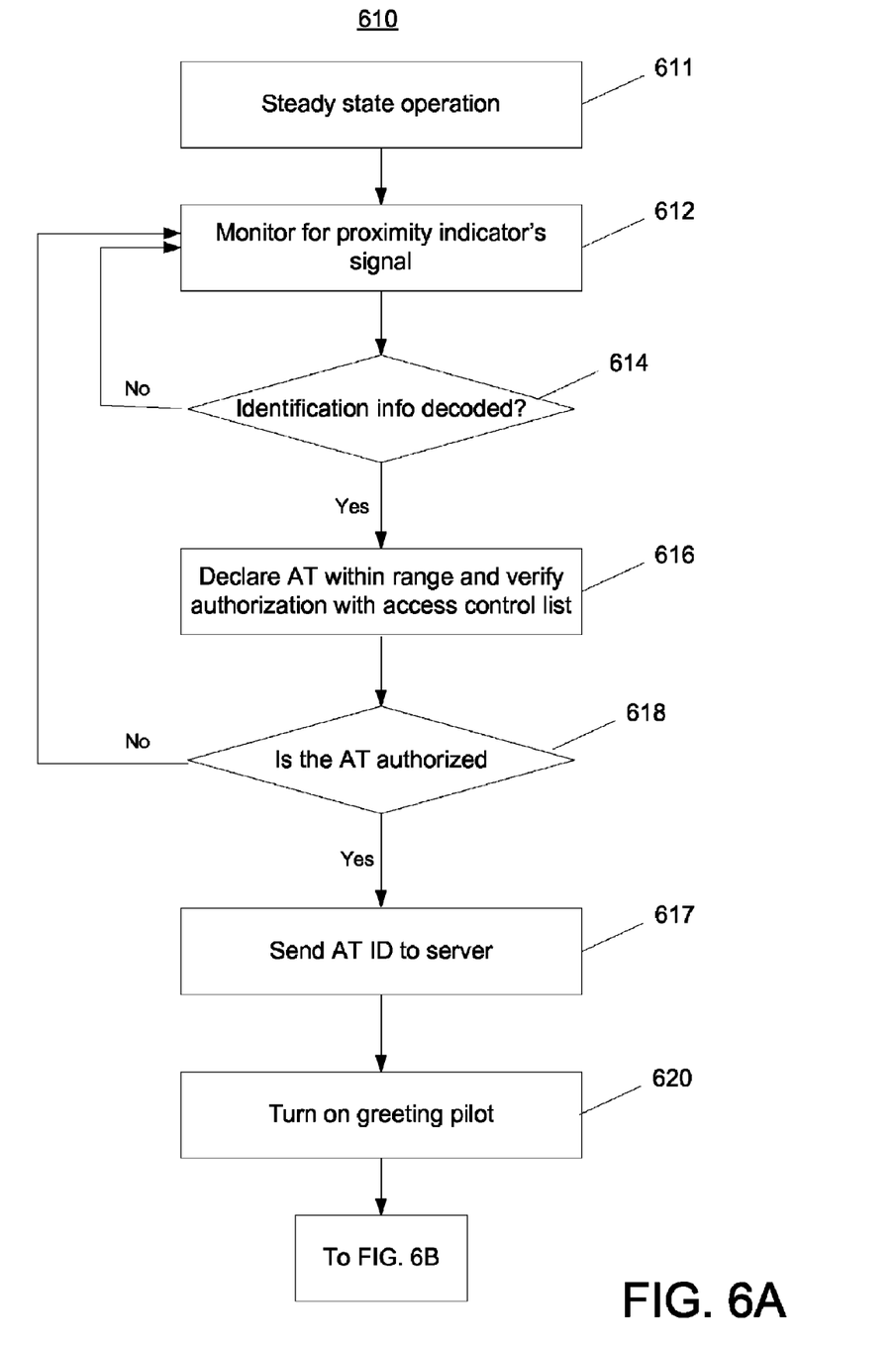
FIGS. 6A-B are a flow diagram of a femtocell hand-in process.
Figure 6B:
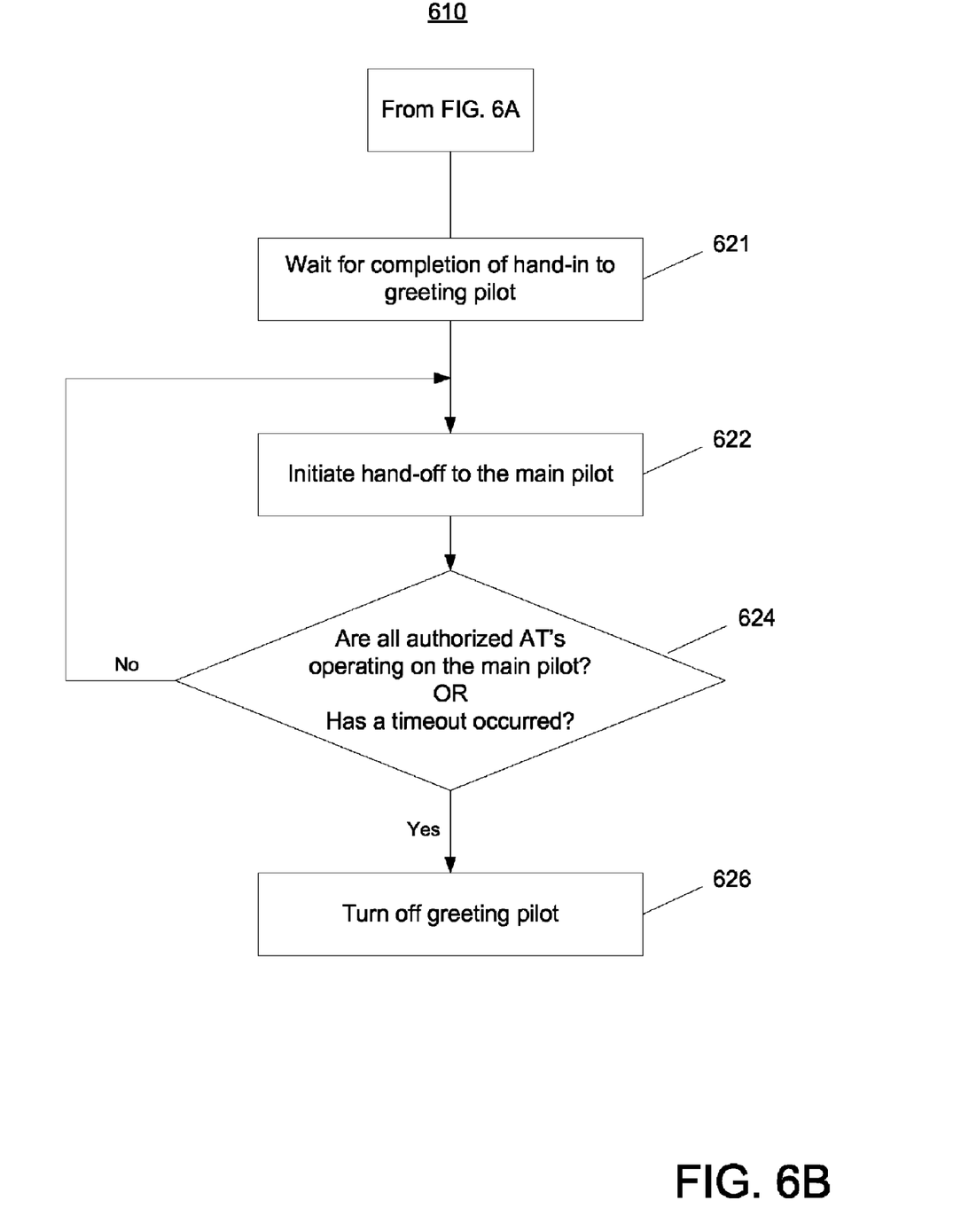

The femtocell hand-off logic 438, which is further described with respect to FIG. 6, performs the functions necessary for a hand-in. As described above, the femtocell 142 turns off its greeting pilot when there is no authorized access terminal detected. Selectively turning on the greeting pilot in this way reduces the probability of RF interference from neighboring femtocells, e.g., femtocells 242b-c, as well as the "false triggering" of nearby unauthorized access terminals that could attempt to communicate with the femtocell 242a.

Figure 5:
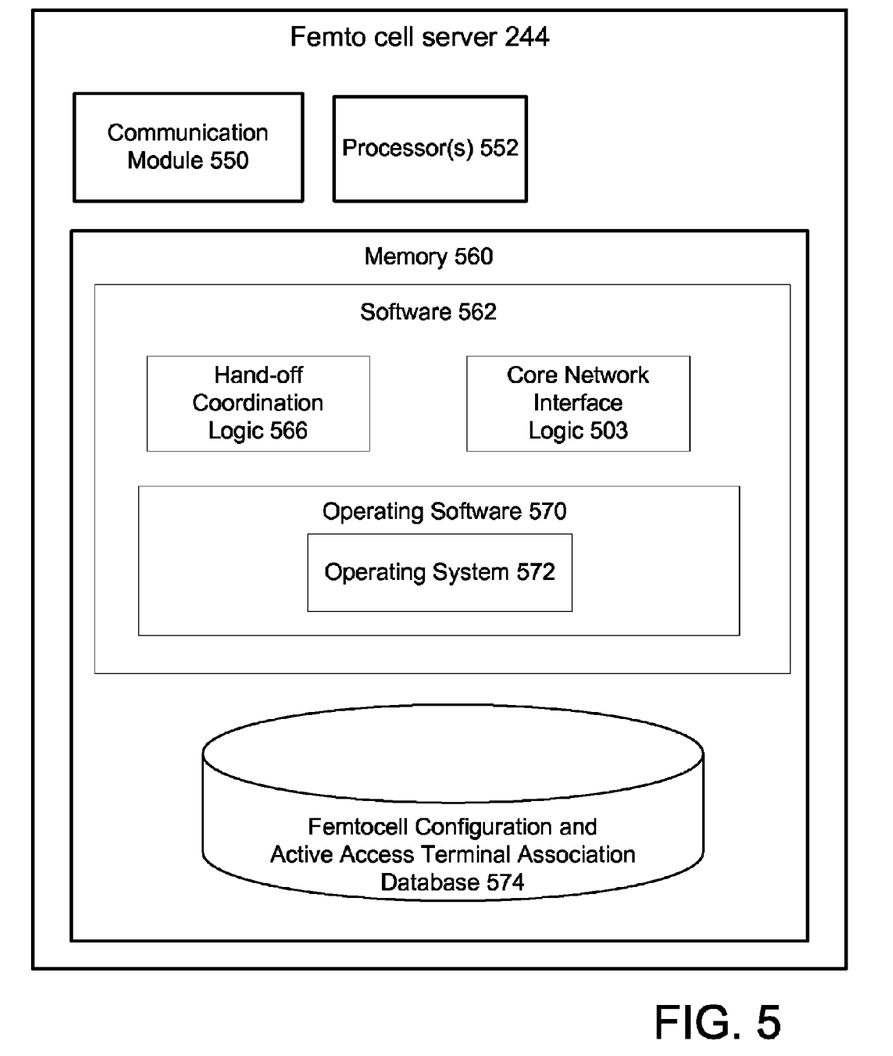
FIG. 5 is a block diagram of a femtocell server.

Referring to FIG. 5, the femtocell server 244 includes one or more processor(s) 552 (referred to simply as "processor 552"), a communication module 550 for effecting communication with the femtocells 242a-c, and memory 560 for storing software 562. The communication module 550 facilitates communication by applying one or more communication methods (e.g., TCP/IP protocols) for transmitting and receiving data over communication links established with the femtocells 242a-c and the service provider's core network 122. In some embodiments, the femtocell server 244 communicates with the femtocells 242a-c using one or more virtual private networks (VPN) setup over a broadband packet-switched service. The processor 552 executes the software 562, which includes hand-off coordination logic 566, core network interface 503 and operating software 570. The operating software 570 includes an operating system 572, such as Linux® or vxWorks®.

The database 574 contains all currently-served femtocells' configurations and their active access terminal associations. The active associations between access terminals and the femtocells 242a-c are kept so that a hand-in request from the macrocell 108 or one of the femtocells 242a-c can be easily directed to the correct femtocell when an authorized access terminal is nearby. The femtocell configurations identify the access terminals that are authorized to communicate with each of the femtocells 242a-c and the unique identification codes assigned to the authorized access terminals' proximity indicators 246.

After the femtocell 242a determines that the access terminal 116 is within range and the access terminal is on the femtocell's access control list, it sends the identification information of the access terminal 116 to the femtocell server 244 and triggers an update of the active associations in the database 574.

The hand-off coordination logic 566 supports access terminal transfers between neighboring femtocells 242a and macrocells (e.g., macrocells 108, 110, and 112). Upon receiving hand-in requests from macrocells through the core network interface logic 503, the femtocell server 244 invokes the core network interface logic 503 to retrieve the access terminal's identification information from the service provider's core network and searches for this identification information in the database 574 to locate all of the femtocells which have an active association with that access terminal. If no femtocell is located which has an active association with the access terminal (as may happen when an access terminal has detected the greeting pilot from a nearby femtocell which was triggered by some other access terminal), the femtocell server 244 terminates the request by sending a rejection response to the hand-in requestor. On the other hand, if one or more femtocells have an active association with that access terminal, the hand-off coordination logic 566 selects the optimal femtocell and signals it to process the hand-in request. In typical embodiments, the selection algorithm aims to distribute the active access terminals evenly among available femtocells so that none of the femtocells become overloaded. The selection algorithm may also involve inputs from the service provider and/or femtocell owner for access point—femtocell affinity settings.

Referring to FIGS. 6A-B, an improved hand-in process with proximity detection 610 performed by the femtocell 242a is described in detail. The femtocell 242a is in steady-state normal operation (611) with its main channel, i.e. its main pilot is on continuously. The femtocell 242a also has been configured with an access control list 402 containing identification information for its authorized access terminals and their associated proximity indicators. In the next step (612), the femtocell 242a listens for signals from nearby proximity indicators. After a signal is detected, the femtocell 242a attempts to extract (214) identification information from the signal received. As described earlier, successful decoding of the identification information indicates that the proximity indicator and associated access terminal 116 are located within communication range of the femtocell 242a. The femtocell 242a compares the decoded identification information against its access control list (616). If a match is determined (618), the femtocell 242a turns on (620) its greeting pilot to facilitate a hand-in and it sends the identification information (617) of the access terminal 116 to the femtocell server 244, triggering an update of the active associations in the database 574. Otherwise, the femtocell 242a keeps its greeting pilot turned off and continues to listen (612) for signals from nearby proximity indicators.

After the greeting pilot has been turned on, the access terminal 116 monitors and reports the greeting pilot's signal strength since the greeting pilot's scrambling code is on the macrocell's neighbor list. The serving macrocell 108 determines whether or not to initiate a hand-off request based on the signal strength reported by the access terminal 116. Enabling the greeting pilot only upon arrival of an authorized handset greatly reduces the chance of hand in attempt for an unauthorized handset to a small "coincidence probability." In other words, in rare situations, a hand-in may be requested for an unauthorized access terminal if it is near an authorized access terminal that has triggered some femtocell's greeting pilot. This coincidence probability is generally very low and significantly lower than the probability of unauthorized hand-in attempt associated with conventional systems. In addition, the femtocell server 244 will reject the hand-in attempt leaving the access terminal 116 connected to the macrocell 108. In a conventional system there is no information on which to base a rejection, so the hand-in attempt will proceed, even though the target femtocell is not in communication range of the access terminal.

After the hand-in to the femtocell's greeting channel is completed (621), the access terminal 116 will receive the main scrambling code for decoding the main pilot from the greeting channel's neighbor list. After the access terminal 116 reports detecting the main pilot, the femtocell 242a initiates (622) a subsequent hand-off to the main pilot. This can be a soft hand-off since the access terminal's uplink is maintained by the same femtocell receiver. The femtocell 242a then determines (624) whether all authorized access terminals are operating on the main pilot. After a positive determination has been made, the femtocell 242a turns (626) off the greeting pilot. The greeting pilot is also turned off after a pre-set time limit even if all authorized handsets have not moved to the main pilot channel. The greeting pilot turn off may be a slow ramp down to ease camped-on access terminals or unauthorized access terminals that are attempting hand-ins away from the femtocell 242a.

In some embodiments, the proximity detectors 245a-c in femtocells 242a-c are equipped with transmitters 489 so that each femtocell can send proximity indication signals about themselves as well as other messages to neighboring femtocells. This capability may be used to allow a group or cluster of femtocells 242a-c to be controlled in concert. Such control may provide automatic cell scrambling code selection, load balancing, and other group-oriented functions. The capability may also be used to minimize power consumption of the proximity indicators 246 by sending querying signal to trigger specific proximity indicators with receiver 385 as described earlier. Battery drain is reduced since receiver function typically consumes much less power than transmit function and the proximity indicator 246 now only transmits in response to a querying signal from a nearby femtocell where it is already authorized rather than transmits periodically in blind hope that some femtocell will responds.

Although the techniques described above employ the UMTS air interface standard, the techniques are also applicable to other CDMA and non-CDMA air interface technologies in which messages can be passed between access terminals and other network components.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions by operating on input data and generating output. Method steps can also be performed by, and apparatuses can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the techniques described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation, or any combination of such back-end, middleware, or front-end components. The components of the system can be interconnected by any form or medium of digital data communication, e.g., a communication network.

Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

Other embodiments are within the scope of the following claims and other claims to which the applicant may be entitled. The following are examples for illustration only and not to limit the alternatives in any way. The techniques described herein can be performed in a different order and still achieve desirable results. Accordingly, other embodiments are within the scope of the following claims.

What is claimed is:

1. A method performed by a network device, comprising:
    configuring the network device with an access control list including identification information for authorized client devices and proximity indicators associated with the client devices;
    detecting a presence of a client device in proximity to the network device by receiving signals from nearby proximity indicators and decoding identification information from the received signals to determine that the client device is located within communication range of the network device;
    determining that the client device is authorized to communicate with the network device by comparing the decoded identification information against the identification information included in the access control list;
    turning-on, based on determining that the client device is authorized to communicate with the network device and detecting that the authorized client device is within communication range of the network device, a first signal that comprises:
        information for enabling the authorized client device to decode and to access information in a second signal;
    wherein the second signal enables communication with the network device;
    transmitting the first signal to the authorized client device; and
    ceasing transmission of the first signal after (i) initiating communication with the authorized client device, and (ii) determining establishment of a communication with the client device using the second signal, or a pre-set time limit.

2. The method of claim 1, further comprising:
    transmitting the second signal continuously during a time when the network device is in service.

3. The method of claim 1, further comprises:
    analyzing a property of the received signals to determine whether the client device is within communication range of the network device.

4. The method of claim 1, wherein (1) a detection of the presence of the client device uses a first communication modality, and (2) the communication with the network device uses a second, different communication modality.

5. The method of claim 4, wherein the first communication modality comprises radio frequency communication and the second communication modality comprises cellular communication.

6. A system comprising:
    one or more processing devices; and
    a non-transitory computer-readable medium configured to store instructions that are executable by the one or more processing devices to perform operations comprising:
        configuring a network device with an access control list including identification information for authorized client devices and proximity indicators associated with the client devices;
        detecting a presence of a client device in proximity to the network device by receiving signals from nearby proximity indicators and decoding identification information from the received signals to determine that the client device is located within communication range of the network device;
        determining that the client device is authorized to communicate with the network device by comparing the decoded identification information against the identification information included in the access control list;
        turning-on, based on determining that the client device is authorized to communicate with the network device and detecting that the authorized client device is within communication range of the network device, a first signal that comprises:
            information for enabling the authorized client device to decode and to access information in a second signal;
        wherein the second signal enables communication with the network device;
        transmitting the first signal to the authorized client device; and
        ceasing transmission of the first signal after (i) initiating communication with the authorized client device, and (ii) determining establishment of a communication with the client device using the second signal, or a pre-set time limit.

7. The system of claim 6, wherein the operations further comprise:
    transmitting the second signal continuously during a time when the system is in service.

8. The system of claim 6, wherein the operations further comprise:
    analyzing a property of the received signals to determine whether the client device is within communication range of the system.

9. The system of claim 6, wherein (1) a detection of the presence of the client device uses a first communication modality, and (2) the communication with the system uses a second, different communication modality.

10. The system of claim 9, wherein the first communication modality comprises radio frequency communication and the second communication modality comprises cellular communication.

11. A non-transitory computer-readable medium configured to store instructions that are executable by a network device to perform operations comprising:
    configuring the network device with an access control list including identification information for authorized client devices and proximity indicators associated with the client devices;
    detecting a presence of a client device in proximity to the network device by receiving signals from nearby proximity indicators and decoding identification information from the received signals to determine that the client device is located within communication range of the network device;
    determining that the client device is authorized to communicate with the network device by comparing the decoded identification information against the identification information included in the access control list;
turning-on, based on determining that the client device is authorized to communicate with the network device and detecting that the authorized client device is within communication range of the network device, a first signal that comprises:
information for enabling the authorized client device to decode and to access information in a second signal;
wherein the second signal enables communication with the network device;
transmitting the first signal to the authorized client device; and
ceasing transmission of the first signal after (i) initiating communication with the authorized client device, and (ii) determining establishment of a communication with the client device using the second signal, or a pre-set time limit.

12. The non-transitory computer-readable medium of claim 11, wherein the operations further comprise:
transmitting the second signal continuously during a time when the network device is in service.

13. The non-transitory computer-readable medium of claim 11, wherein the operations further comprise:
analyzing a property of the received signals to determine whether the client device is within communication range of the network device.

14. The non-transitory computer-readable medium of claim 11, wherein (1) a detection of the presence of the client device uses a first communication modality, and (2) the communication with the network device uses a second, different communication modality.

15. The non-transitory computer-readable medium of claim 14, wherein the first communication modality comprises radio frequency communication and the second communication modality comprises cellular communication.

* * * * *